United States Patent

Miyake

[11] Patent Number: 5,822,462
[45] Date of Patent: Oct. 13, 1998

[54] IMAGE PROCESSING APPARATUS

[75] Inventor: Nobutaka Miyake, Yokohama, Japan

[73] Assignee: Canon Kabushiki Kaisha, Tokyo, Japan

[21] Appl. No.: 942,850

[22] Filed: Sep. 10, 1992

[30] Foreign Application Priority Data

Sep. 11, 1991 [JP] Japan ................................ 3-231512
Oct. 4, 1991 [JP] Japan ................................ 3-257618

[51] Int. Cl.⁶ .............................. G06K 9/36; G06K 9/46
[52] U.S. Cl. ...................... 382/251; 382/250; 348/405
[58] Field of Search ........................... 382/56, 50, 43, 382/280, 250, 252, 251, 248; 358/432, 433, 466; 348/403–405

[56] References Cited

U.S. PATENT DOCUMENTS

| | | | |
|---|---|---|---|
| 4,774,574 | 9/1988 | Daly et a. | 348/406 |
| 4,776,030 | 10/1988 | Tzou | 382/56 |
| 5,150,429 | 9/1992 | Miller et al. | 382/50 |
| 5,172,237 | 12/1992 | Blonstein et al. | 382/56 |
| 5,243,420 | 9/1993 | Hibi | 358/135 |

FOREIGN PATENT DOCUMENTS 164532 12/1986 Japan.

OTHER PUBLICATIONS

H. Yasuda, "International Standardization for Color Photographic Coding", Journal of the Institute of Electronics Engineers of Japan, vol. 18, No. 6, pp. 398–407 (1989).

Primary Examiner—Leo Boudreau
Assistant Examiner—Bhavesh Mehta
Attorney, Agent, or Firm—Fitzpatrick, Cella, Harper & Scinto

[57] ABSTRACT

An image processing apparatus for scalar-quantizing discrete-cosine transformation coefficients detects quantization error based upon a first odd function component of the discrete-cosine transformation coefficients, changes over the quantization conditions of a second odd function component of the discrete-cosine transformation coefficients in accordance with the quantization error detected, and performs scalar quantization in accordance with the quantization conditions thus changed over.

12 Claims, 22 Drawing Sheets

| 29 29 29 29 29 29 | 28 27 25 22 18 15 13 12 | 9 9 9 9 9 9 9 | 8 8 8 8 8 8 8 8 |
|---|---|---|---|
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 29 29 29 29 29 29 | 28 27 25 22 18 15 13 12 | 9 9 9 9 9 9 9 | 8 8 8 8 8 8 8 8 |
| 27 27 27 27 27 27 | 29 28 25 22 19 16 14 12 | 8 8 8 8 8 8 8 8 | 8 8 8 8 8 8 8 8 |
| 27 27 27 27 27 27 | 28 27 24 21 18 15 12 11 | 8 8 8 8 8 8 8 8 | 8 8 8 8 8 8 8 8 |
| 27 27 27 27 27 27 | 26 24 22 19 16 13 10 9 | 8 8 8 8 8 8 8 8 | 8 8 8 8 8 8 8 8 |
| 27 27 27 27 27 27 | 23 22 19 16 13 10 7 6 | 8 8 8 8 8 8 8 8 | 8 8 8 8 8 8 8 8 |
| 27 27 27 27 27 27 | 20 19 16 13 10 7 4 3 | 8 8 8 8 8 8 8 8 | 8 8 8 8 8 8 8 8 |
| 27 27 27 27 27 27 | 17 16 13 10 7 4 2 0 | 8 8 8 8 8 8 8 8 | 8 8 8 8 8 8 8 8 |
| 27 27 27 27 27 27 | 15 14 11 8 5 2 0 0 | 8 8 8 8 8 8 8 8 | 8 8 8 8 8 8 8 8 |
| 27 27 27 27 27 27 | 14 12 10 7 4 1 0 0 | 8 8 8 8 8 8 8 8 | 8 8 8 8 8 8 8 8 |
| 19 19 19 19 19 19 | 23 21 18 13 9 4 1 0 | 11 11 11 11 11 11 11 | 8 8 8 8 8 8 8 8 |
| 19 19 19 19 19 19 | 21 19 17 13 9 5 3 1 | 11 11 11 11 11 11 11 | 8 8 8 8 8 8 8 8 |
| 19 19 19 19 19 19 | 18 17 15 12 10 7 5 4 | 11 11 11 11 11 11 11 | 8 8 8 8 8 8 8 8 |
| 19 19 19 19 19 19 | 13 13 12 11 10 9 9 | 11 11 11 11 11 11 11 | 8 8 8 8 8 8 8 8 |
| 19 19 19 19 19 19 19 | 9 9 10 11 12 13 13 | 11 11 11 11 11 11 11 | 8 8 8 8 8 8 8 8 |
| 19 19 19 19 19 19 19 | 4 5 7 10 12 15 17 18 | 11 11 11 11 11 11 11 | 8 8 8 8 8 8 8 8 |
| 19 19 19 19 19 19 19 | 1 3 5 9 13 17 19 21 | 11 11 11 11 11 11 11 | 8 8 8 8 8 8 8 8 |
| 19 19 19 19 19 19 | 0 1 4 9 13 18 21 23 | 11 11 11 11 11 11 11 | 8 8 8 8 8 8 8 8 |

FIG. 9

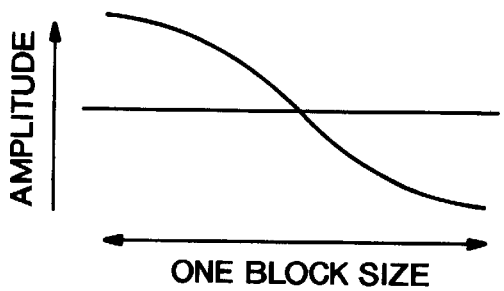
FIG. 11A
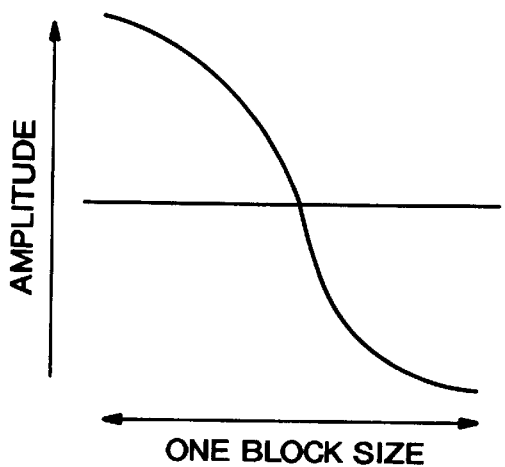
FIG. 11B
FIG. 11C
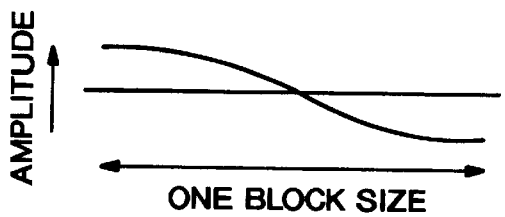
FIG. 11D

IN

| | | | | | | | |
|---|---|---|---|---|---|---|---|
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |
| 120 | 110 | 100 | 90 | 80 | 70 | 60 | 50 |

FIG. 14A

DCT

| | | | | | | | |
|---|---|---|---|---|---|---|---|
| -334 | 182 | 0 | 19 | 0 | 6 | 0 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 14B

DCT(Q)

| | | | | | | | |
|---|---|---|---|---|---|---|---|
| -344 | 190 | 0 | 38 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 14C

IDCT

| | | | | | | | |
|---|---|---|---|---|---|---|---|
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |
| 124 | 112 | 97 | 88 | 82 | 73 | 58 | 46 |

FIG. 14D

DCT(Q)

```
-344  190    0    0    0    0    0    0
   0    0    0    0    0    0    0    0
   0    0    0    0    0    0    0    0
   0    0    0    0    0    0    0    0
   0    0    0    0    0    0    0    0
   0    0    0    0    0    0    0    0
   0    0    0    0    0    0    0    0
   0    0    0    0    0    0    0    0
```

F I G. 15A

IDCT

```
118  113  104   92   78   66   57   52
118  113  104   92   78   66   57   52
118  113  104   92   78   66   57   52
118  113  104   92   78   66   57   52
118  113  104   92   78   66   57   52
118  113  104   92   78   66   57   52
118  113  104   92   78   66   57   52
118  113  104   92   78   66   57   52
```

F I G. 15B

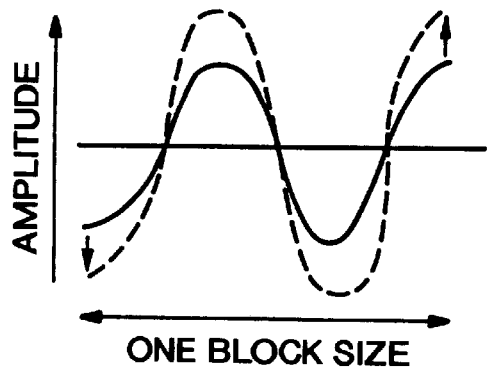
F I G. 16E
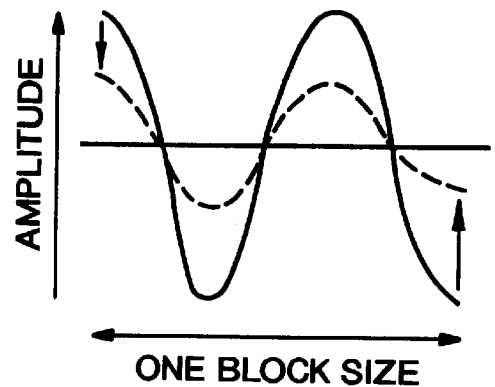
F I G. 16F
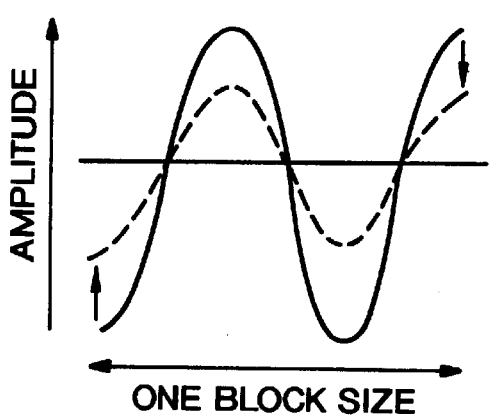
F I G. 16G
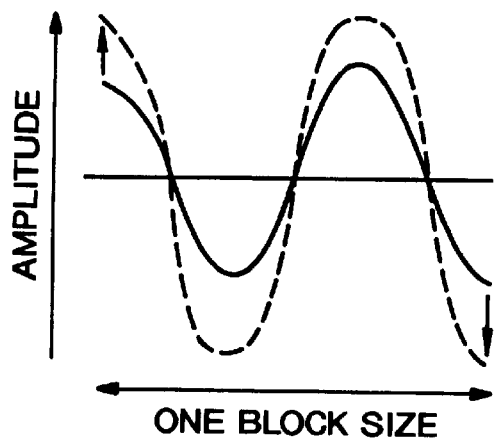
F I G. 16H

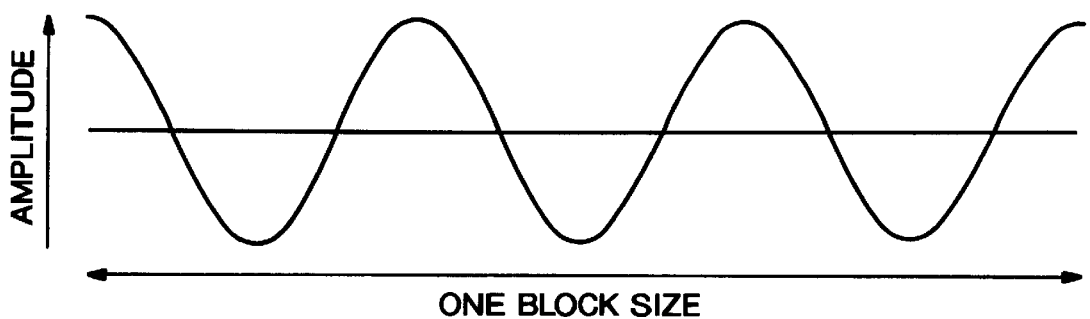
F I G. 18A
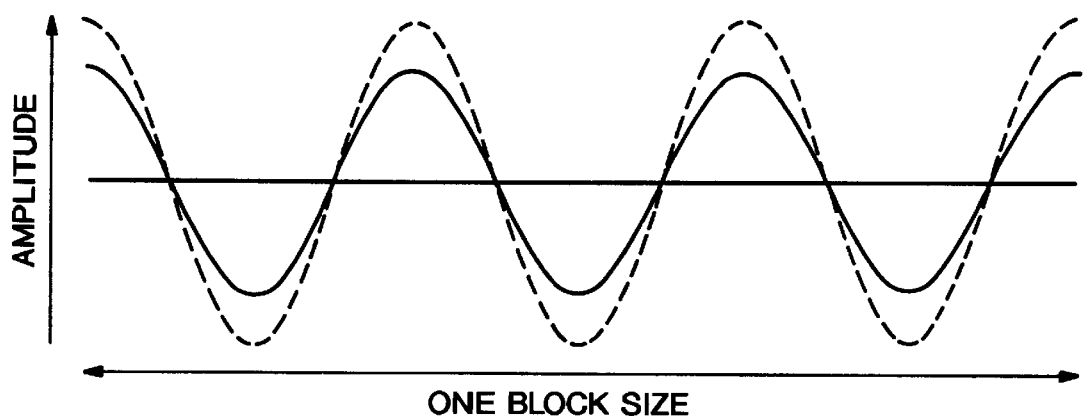
F I G. 18B
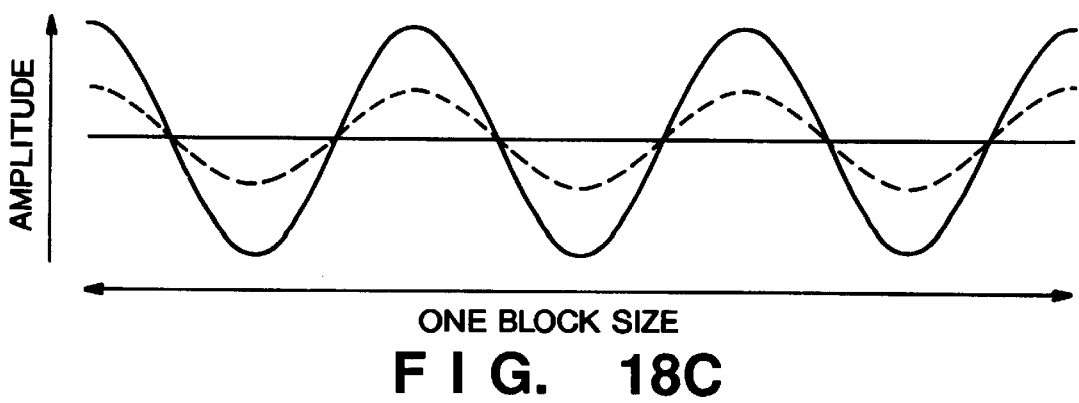
F I G. 18C

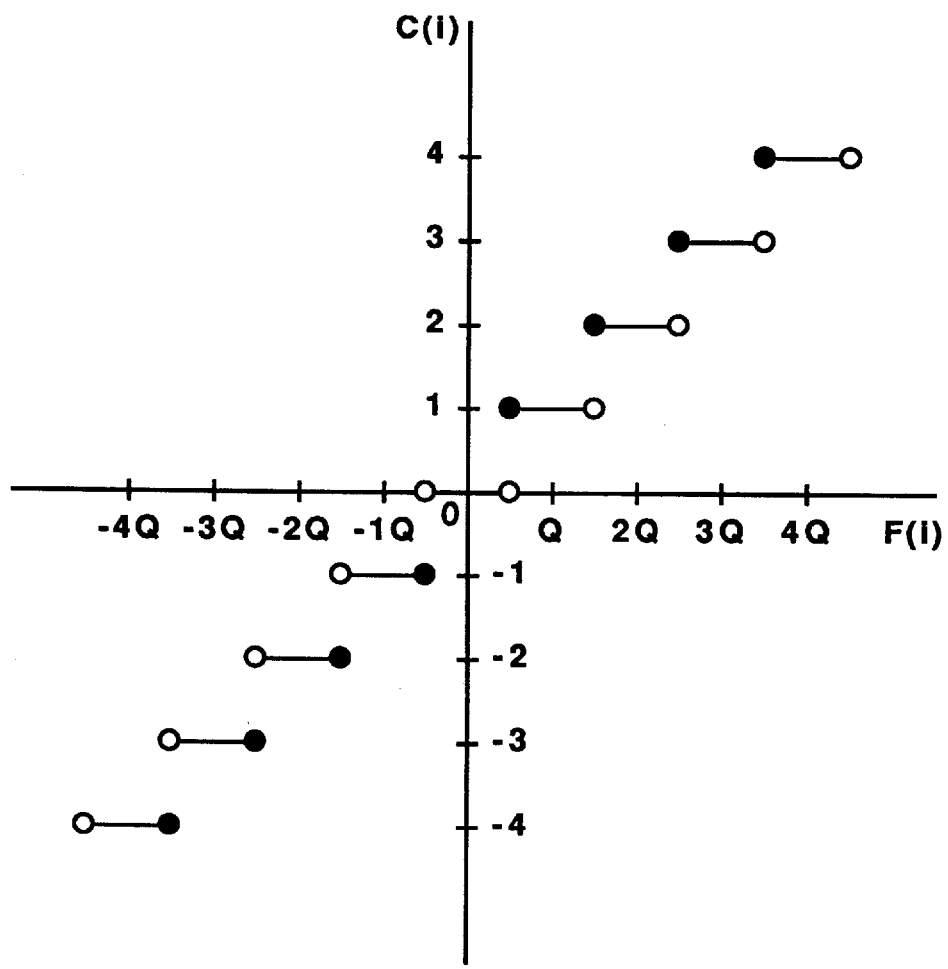
F I G. 19

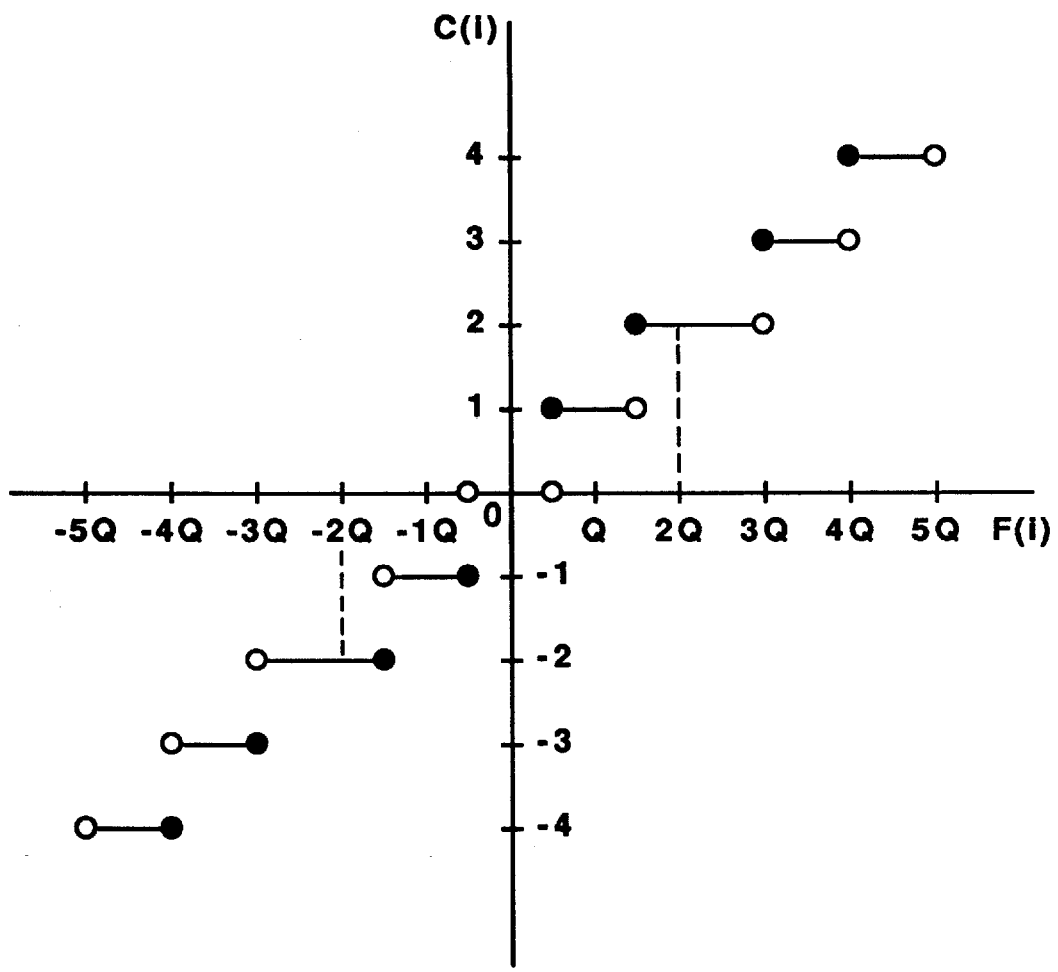
F I G. 20

```
16   11   10   16   24   40   51   61
12   12   14   19   26   58   60   55
14   13   16   24   40   57   69   56
14   17   22   29   51   87   80   62
18   22   37   56   68  109  113   92
49   64   78   87  103  121  120  101
72   92   95   98  112  100  103   99
```

F I G.  22

```
16   32   32   32   32   32   32   32
32   32   32   32   32   32   32   32
32   32   32   32   32   32   32   32
32   32   32   32   32   32   32   32
32   32   32   32   32   32   32   32
32   32   32   32   32   32   32   32
32   32   32   32   32   32   32   32
32   32   32   32   32   32   32   32
```

F I G.  23

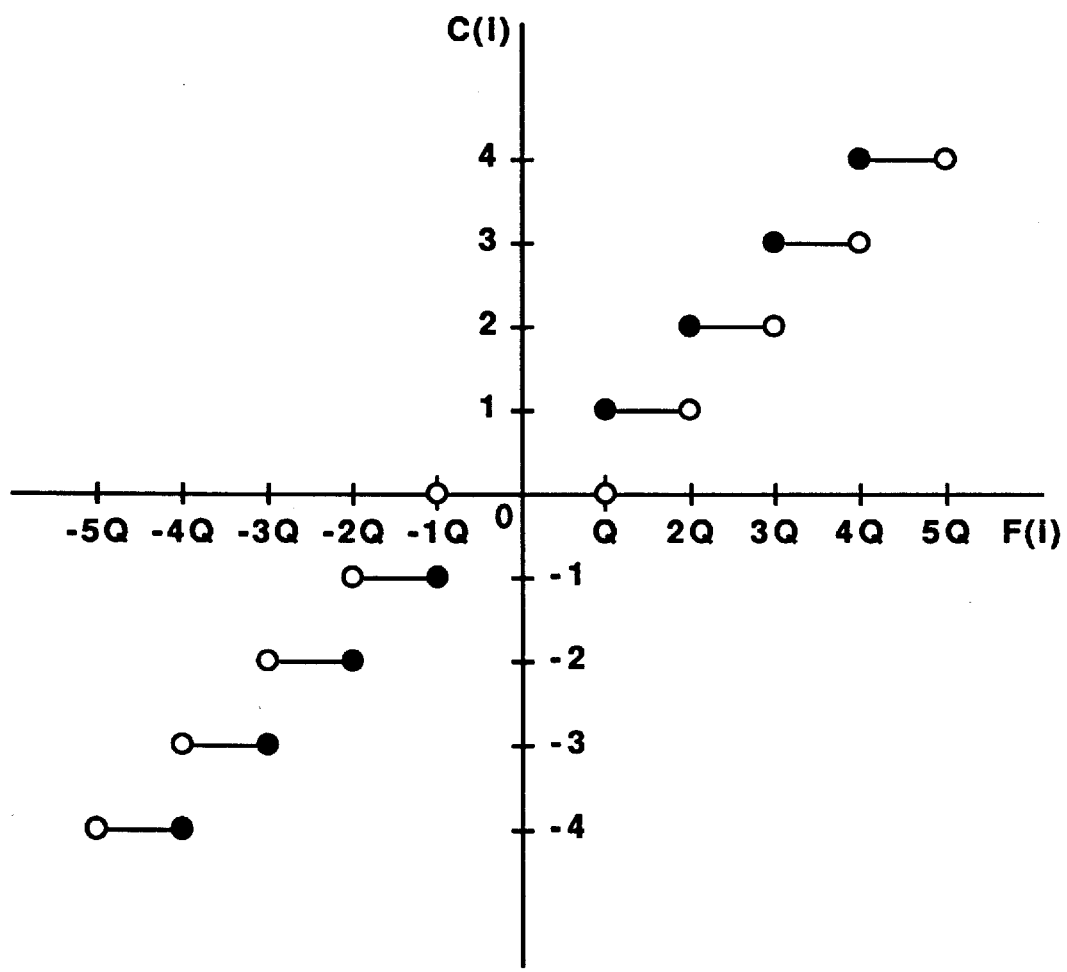
F I G.   24

IMAGE PROCESSING APPARATUS

BACKGROUND OF THE INVENTION

This invention relates to an image compressing apparatus, such as an image compressing apparatus having an orthogonal transformation function.

The memory capacity necessary for storing a full color image (hereinafter referred to as an "image") such as a photograph in a memory is calculated by multiplying the number of pixels by the number of tone bits required per pixel. This makes necessary an enormous memory capacity in order to store a high-quality color image. For this reason, a variety of methods of compressing the amount of information have been proposed. For example, attempts have been made to reduce the required memory capacity by first compressing the image information and then storing the compressed information in memory.

FIG. 1 is a block diagram showing a coding method (see "International Standardization for Color Photographic Coding", Hiroshi Yasuda, The Journal of the Institute of Image Electronics Engineers of Japan, Vol. b 18, No. 6, pp. 398–409, 1989) of a baseline system proposed by the JPEG (Joint Photographic Experts Group) as a method of achieving international standardization of color still-picture coding.

In FIG. 1, pixel data entered from an input terminal 1 is cut into an 8—8 pixel block in a block forming circuit 2, the data is subjected to a cosine transformation by a discrete cosine transformation (hereinafter referred to as "DCT") circuit 17, and the transformation coefficients obtained by the transformation are supplied to a quantization (hereinafter referred to as "Q") unit 40. In accordance with quantization-step information supplied by a quantization (Q) table 41, the Q unit 40 subjects the transformation coefficients to linear quantization. Of the quantized transformation coefficients, a DC coefficient is applied to a predictive coding circuit [hereinafter referred to as a "DPCM (differential pulse-coded modulation) circuit"] 42, which obtains the differential (a prediction error) between this DC coefficient and the DC component of the preceding block. The difference is applied to a one-dimensional Huffman coding circuit 43.

FIG. 2 is a block diagram showing the structural details of the DPCM 42. The quantized DC coefficient from the Q unit 40 is applied to a delay circuit 53 and a subtractor 54. The delay circuit 53 applies a delay equivalent to the time needed for the discrete cosine transformation circuit to operate on one block, namely 8—8 pixels. Accordingly, the delay circuit 53 supplies the subtractor 54 with the DC coefficient of the preceding block. As a result, the subtractor 54 outputs the differential (prediction error) between the DC coefficient of the current block and that of the preceding block. In this predictive coding, the value of the preceding block is used as the prediction value, and therefore the predicting unit is constituted by the delay circuit, as set forth above.

In accordance with a DC Huffman code table 44, the one-dimensional Huffman coding circuit 43 applies variable-length coding to the prediction error signal supplied by the DPCM 42 and supplies a multiplexer 51 with the data, i.e., a DC Huffman code, that has been variable-length coded.

An AC coefficient (a coefficient other than the DC coefficient) quantized by the Q unit 40 is zigzag scanned in order from coefficients of lower order, as shown in FIG. 3, by means of a scan converting circuit 45, and the output of the scan converting circuit 45 is applied to a significant-coefficient detector circuit 46. The latter determines whether the quantized AC coefficient is "0" or not. If the AC coefficient is "0", a count-up signal is supplied to a run-length counter 47, thereby incrementing the counter. If the coefficient is "1", however, a reset signal is applied to the run-length counter 47 to reset the counter, and the coefficient is split into a group number SSSS and annexed bits, as shown in FIG. 4, by a grouping circuit 48. The group number SSSS is supplied to a two-dimensional Huffman coding circuit 49, and the annexed bits are supplied to the multiplexer 51. The run-length counter 47 counts a "0" run length and supplies the two-dimensional Huffman coding circuit 49 with the number NNNN of consecutive "0"s between significant coefficients other than "0". In accordance with the AC Huffman code table 50, the Huffman coding circuit 49 applies variable-length coding to the "0" run length NNNN and the significant-coefficient group number SSSS of significant coefficients and supplies the multiplexer 51 with the data, i.e., an AC Huffman code, that has been variable-length coded.

The multiplexer 51 multiplexes the DC Huffman code, AC Huffman code and annexed bits of one block (8—8 input pixels) and outputs the multiplexed data, namely compressed image data, from its output terminal 52. Accordingly, the compressed data outputted by the output terminal 52 is stored in a memory, and at read-out the data is decompressed by a reverse operation, thereby making it possible to reduce memory capacity.

However, the example of the prior art described above has a disadvantage. For example, consider application of the prior art to an image output unit. In general, an image output unit often is connected to an image input unit such as a host computer or image scanner and operates as part of a system. In such case, various images, such as computer graphics produced by the host computer or images inputted from the image scanner are sent to the image output unit.

In the prior art described above, the method employs a DCT transformation and scalar quantization. However, a problem arises with DCT transformation and scalar quantization, as will now be described.

In a case where the above-described prior art is applied to a facsimile machine, a printer or a memory device, it is required that data compression be performed at a comparatively low bit rate. If the aforementioned prior art is designed to compress data at a low bit rate, coarse quantization is performed by changing over the Q table or by increasing the scaling factor of the Q table, i.e., increasing the coefficients which multiply the quantization steps.

FIG. 5 illustrates a Q table serving as a reference, FIG. 6 input information of part of a block (a 3-4 block, where 8—8 serves as one entire block), FIG. 7 transformation coefficients following a DCT transformation, FIG. 8 information obtained as a result of scalar-quantizing FIG. 7 by a step size obtained by multiplying the Q table of FIG. 5 by a scaling factor of 4.0 (where DC components are given a fixed length of eight bits without using DPCM and irrespective of the scaling factor), and FIG. 9 image information obtained by decompressing (by applying IDCT to) the information of FIG. 8. A comparison of FIGS. 6 and 9 reveals that as a result of DCT and quantization block by block, the image information following decompression develops distortion at the boundaries between blocks. This deterioration of the image information is so-called block distortion. More specifically, with compression at a low bit rate, block distortion is produced by an increase in the quantization error, as a result of which there is a marked decline in image quality.

In general, a full-color image such as a photograph inputted by a device such as an image scanner tends to have its significant coefficients concentrated in the low region of a block orthogonally transformed by DCT or the like; the high region often becomes "0". The variable-length coding operation mentioned above is executed up to the significant coefficient that appears last when the AC coefficients of the above-mentioned block are zigzag scanned. Consequently, all of the AC coefficients in the high region become "0", and the more the significant coefficient that appears last is shifted toward the low region, the higher the efficiency of compression by variable-length coding.

However, in a case where coarse quantization is performed, even though there is no deterioration in image quality in flat portions of the original image where the AC power is small, ringing, which is referred to as so-called "mosquito noise", is produced near the edges of the decompressed image, as at the edge portions of an original image having a large AC power, and here the decline in image quality is highly conspicuous.

SUMMARY OF THE INVENTION

An object of the present invention is to provide an image processing apparatus in which quantization errors at block boundaries are quantized in mutually canceling directions rather than being added, whereby distortion at block boundaries that leads to conspicuous deterioration in the visual image is alleviated through a simple arrangement so that output of an excellent image can be achieved.

Another object of the present invention is to provide an image processing apparatus in which, even when coarse quantization is performed, ringing referred to as "mosquito noise" is not produced near the edges of a decompressed image, so that a deterioration in image quality can be suppressed.

A further object of the present invention is to provide an image processing apparatus in which it is possible to reduce the quantity of information obtained after the coding of image edges, line drawings and characters.

According to one aspect of the present invention is provided an image processing apparatus for quantizing orthogonal-transformation coefficients, comprising detecting means for detecting quantization error based upon a first odd function component of the orthogonal-transformation coefficients, changing means for changing quantization conditions of a second odd function component of the orthogonal-transformation coefficients in accordance with the quantization error detected by the detecting means, and quantizing means for performing quantization in accordance with the quantization conditions changed by the changing means.

Another aspect of the present invention is provided an image processing apparatus for quantizing orthogonal-transformation coefficients, comprising detecting means for detecting power value based upon inputted orthogonal-transformation coefficients, setting means for non-linearly setting a range of quantization threshold value based upon results of detection performed by the detecting means, and quantizing means for quantizing the inputted orthogonal-transformation coefficients in accordance with the quantization threshold value set by the setting means.

Still another aspect of the present invention is provided an image processing apparatus for quantizing orthogonal-transformation coefficients, comprising a plurality of different quantizing means, selecting means for selecting the plurality of different quantizing means in accordance with orthogonal-transformation coefficients of a high frequency region, wherein quantization of the orthogonal-transformation coefficients is executed using the quantizing means selected by the selecting means, and the plurality of quantizing means includes first quantizing means which corresponds to rounding off to the nearest whole number and second quantizing means which corresponds to omission, and said selecting means selects said first quantizing means when an orthogonal-transformation coefficient of the high frequency region is less than a predetermined quantization threshold value, and selects said second quantizing means when the orthogonal-transformation coefficient of the high frequency region is greater than said predetermined quantization threshold value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing an example of a standard table;

Figure 6:
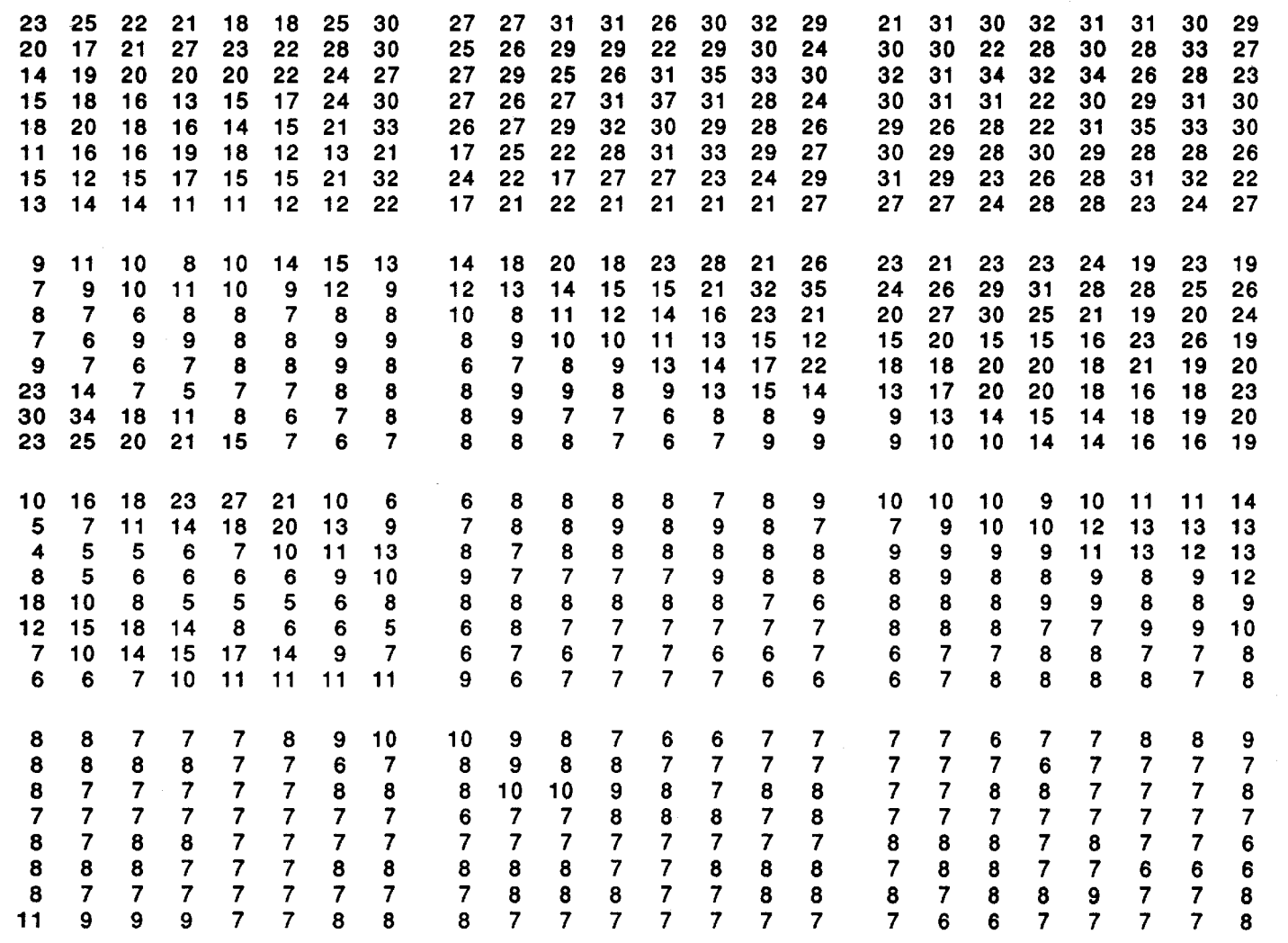

FIG. 6 is a diagram showing an example of a 3–4 block in which input of an actual image is represented;

Figure 7:
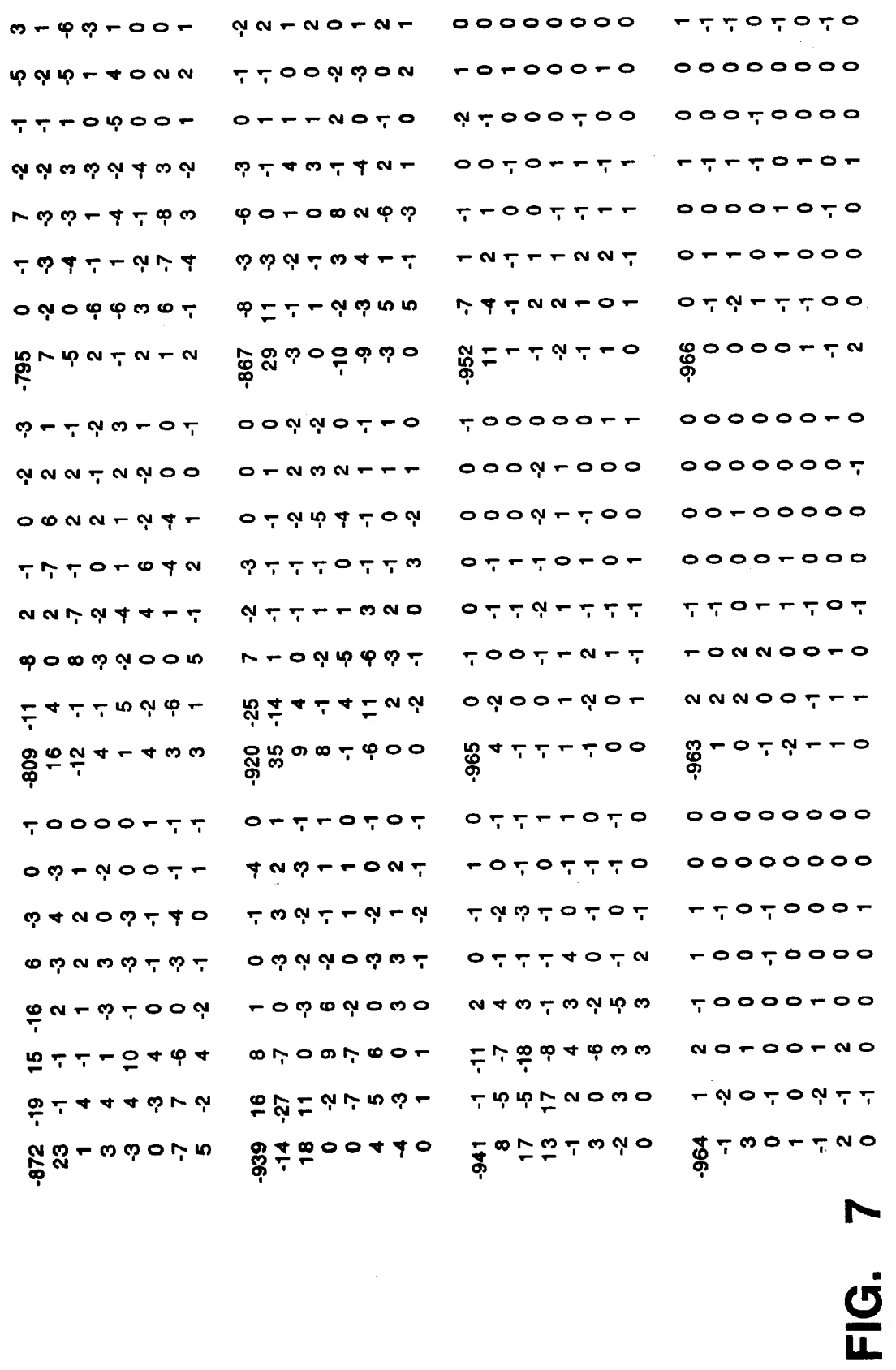

FIG. 7 is a diagram showing an example of a 3–4 block in which DCT of an actual image is represented;

Figure 8:
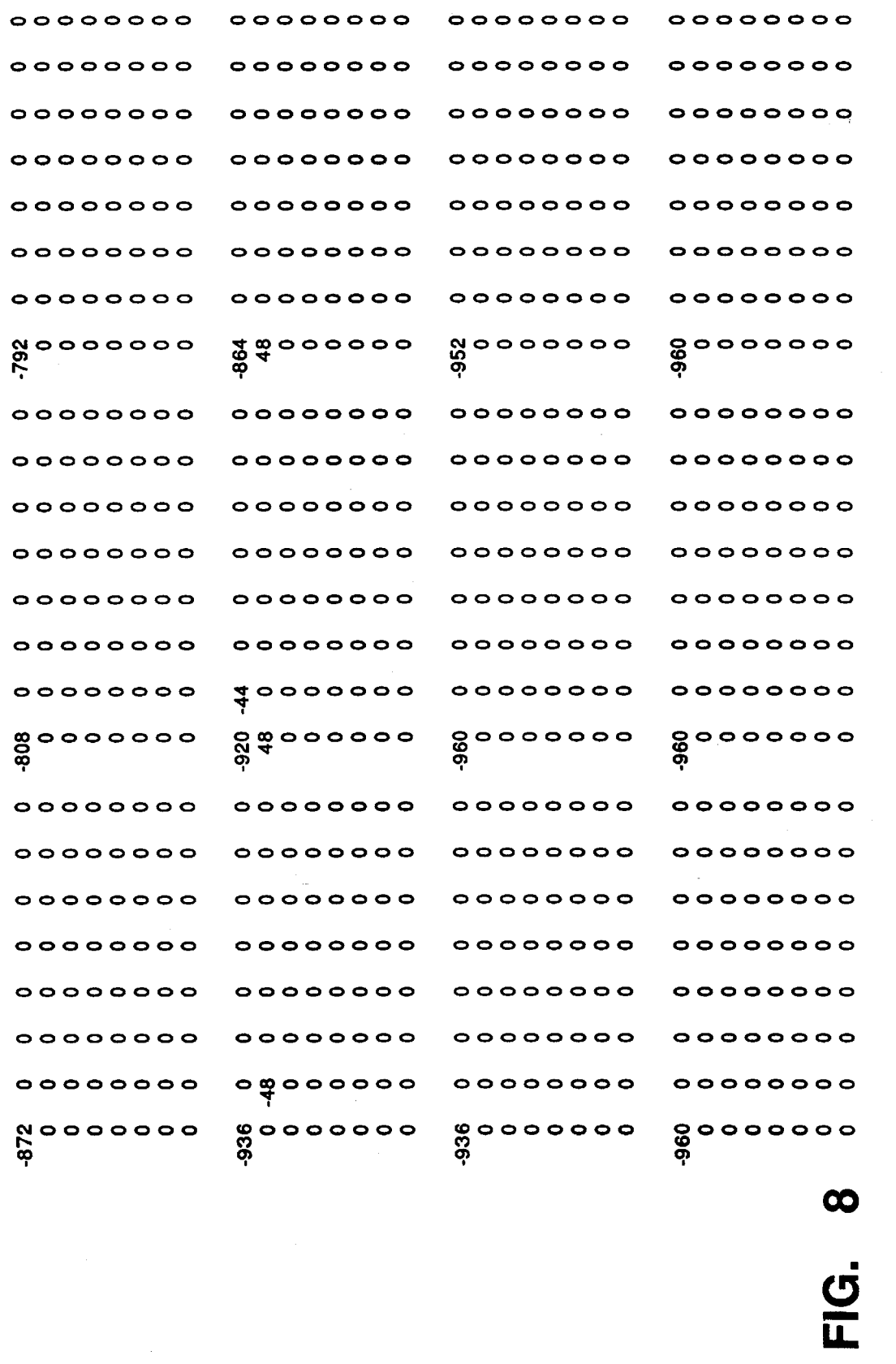

FIG. 8 is a diagram showing an example of a 3–4 block in which quantization of an actual image is represented;

FIG. 9 is a diagram showing an example of a 3–4 block in which IDCT of an actual image is represented;

Fig. 11A is a diagram illustrating addresses of DCT coefficients.

Fig. 11B is a diagram illustrating an example of an odd function corresponding to a DCT coefficient of address 1.

Figs. 11C and 11D are diagrams illustrating examples of odd functions obtained by means of the quantization result of the DCT coefficient used in Fig. 11B.

FIGS. 14A, 14B, 14C and 14D are diagrams illustrating examples of actual images according to the first embodiment;

FIGS. 15A and 15B are diagrams for describing quantization and IDCT according to the first embodiment;

FIGS. 16A, 16B, 16C, 16D, 16E, 16F, 16G and 16H are diagrams for describing a method of canceling out quantization error according to a second embodiment of the invention;

FIGS. 18A, 18B and 18C are is a diagrams showing an example of a quantization error of a basic image in a third embodiment of the invention;

FIG. 19 is a diagram showing an example of general quantization;

FIG. 20 is a diagram showing an example of quantization according to the third embodiment;

FIG. 22 is a diagram showing an example of a general quantization table;

FIG. 23 is a diagram showing an example of a quantization table according to a fourth embodiment of the present invention; and FIG. 24 is a diagram showing an example of quantization according to the fourth embodiment.

DESCRIPTION OF THE PREFERRED EMBODIMENTS

The preferred embodiments of the present invention will now be described with reference to the accompanying drawings.

<First Embodiment>

Figure 10:
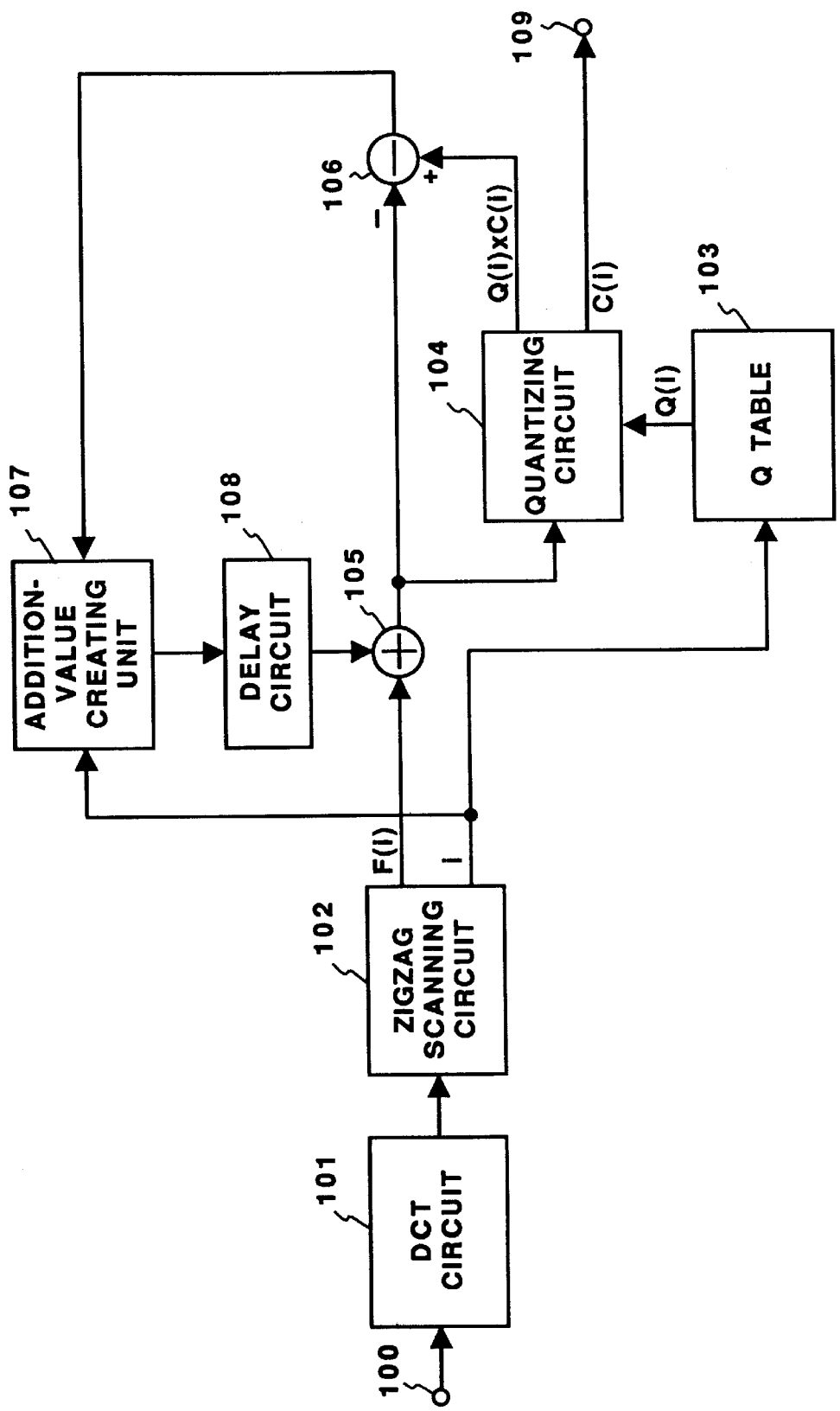
FIG. 10 is a block diagram illustrating a first embodiment of the present invention.

FIG. 10 is a block diagram illustrating the principal portions of an image processing apparatus according to a first embodiment of the present invention. The apparatus has an input terminal 100 from which input image information in block form is inputted successively by raster scanning, a DCT circuit 101 for applying a DCT transformation to information that has been stored in a buffer (not shown) equivalent to one block, and a zigzag scanning circuit 102 for zigzag scanning coefficients that have been subjected to DCT (namely DCT coefficients) from low-region components to high-region components. The zigzag scanning circuit 102 outputs DCT coefficients [let these be represented by F(i)] and addresses (let these be represented by i). The address signal enters a Q table 103. The Q table 103 is constituted by an LUT (look-up table), by way of example, which outputs information indicative of the quantization step corresponding to the input address. This information enters a quantizing circuit 104.

Meanwhile, the DCT coefficients outputted by the zigzag scanning circuit 102 enter the quantizing circuit 104 through an adder 105. The quantization performed by the quantizing circuit 104 is in accordance with the following, just as in the case of the general JPEG method described earlier:

$$C(i)=[F(i)+Q(i)/2]/Q(i) \qquad [F(i) \geq 0]$$

$$C(i)=[F(i)-Q(i)/2]/Q(i) \qquad [F(i)<0]$$

where i: address, F(i): DCT coefficient Q(i): quantization step, C(i): quantization coefficient  ... (1)

The adder 105 will be described later.

The quantizing circuit 104 outputs the quantization coefficient C(i) as well as the value [Q(i)×C(i)], which is the result of multiplying the quantization step Q(i) by the quantization coefficient C(i). The apparatus has an output terminal 109 whence C(i) is transmitted to the block (not shown) that follows quantization. The apparatus further includes a subtractor 106 for calculating the difference between the DCT coefficient which has not been quantized and a representative value (quantization step×quantization coefficient) higher than a threshold value after quantization. The difference value calculated by the subtractor 106 and the zigzag scanning address signal are inputted to an addition-value creating unit 107, which is constituted by a ROM. In accordance with the two inputs, the unit 107 outputs a corresponding addition value based upon an LUT (look-up table). After a predetermined time delay, a delay circuit 108 adds the DCT coefficient to the addition value at the time of a certain address. According to this embodiment, block distortion is mitigated in a manner described below in the circuit arrangement set forth above.

Figure 12:
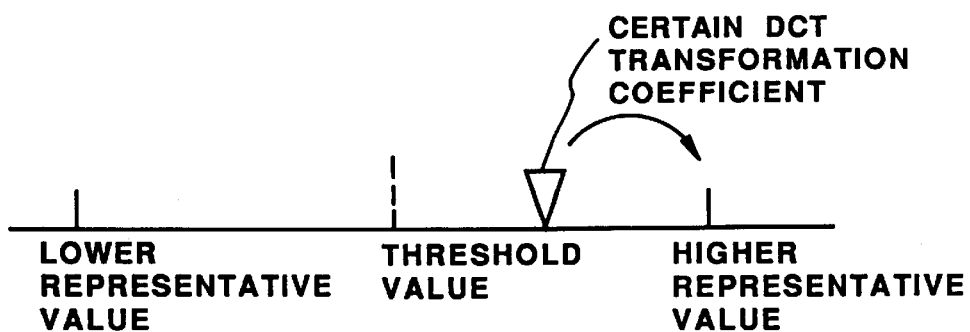
FIG. 12 is a diagram for describing quantization according to the first embodiment.

FIG. 11A is a diagram for describing DCT coefficients determined in accordance with zigzag scanning according to the first embodiment, and FIG. 12 is a diagram for describing quantization according to the first embodiment.

FIG. 11A shows address signals which indicate the order of zigzag scanning in one block. Attention will be directed to the component of address 1. FIG. 11B illustrates an odd function corresponding to the transformation coefficient in the transverse direction (assumed to be the main scanning direction hereinafter) of address 1. For example, in a case where the signal of address 1 takes on a different value owing to quantization, i.e., when the AC power of address 1 increases and decreases, the AC power of Fig. 11B undergoes a change in amplitude in the manner shown in FIGS. 11C and 11D. That is to say, there is a difference depending upon whether an upper representative value or a lower representative value is selected, which depends upon whether the DCT coefficient is greater than a set threshold value or not. A state in which block distortion visibly worsens often appears in portions where image density increases or decreases gradually in a predetermined direction. More specifically, the reason for this is that as a result of quantizing a component of an odd function as in the manner of address 1, the amplitude of Fig. 11B is converted as shown in Fig. 11C (increase) or Fig. 11D (decrease), and tone jump occurs at the boundaries between blocks in the image after decompression. The same will hold true in the vertical direction (assumed to be the subordinate scanning direction hereinafter) also with regard to address 2 in FIG. 11A. Existence of a component of an odd function in either th main scanning direction or subordinate scanning direction among the 23 AC components within one block, causes the occurrence of block distortion due to quantization of the component. However, attention will be directed to the components of addresses 1 and 2, which are most dominant in image deterioration. By nature, DCT is such that an original function is made an even function using a mirror image and is represented solely as cosine components in overlapping form. Consequently, addresses that are odd functions and addresses that are even functions differ in nature even in quantization of the DCT coefficients.

Even if the component of address 1 is quantized and a higher representative value is selected, the output of the subtractor 106 in FIG. 10 becomes a positive value. The reason for this is that quantization coefficient×quantization step is greater than the DCT coefficient.

Attention will now be directed to address 6, which is an odd function in the main scanning direction.

Figure 13A:
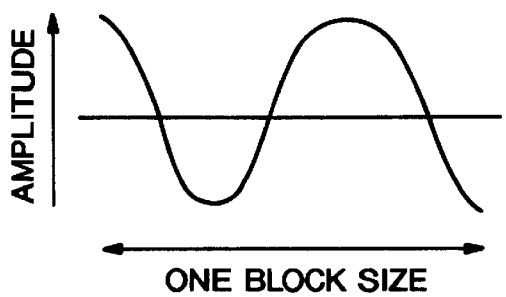
Fig. 13A is a diagram illustrating an example of an odd function corresponding to a DCT coefficient of address 6.
Figure 13B:
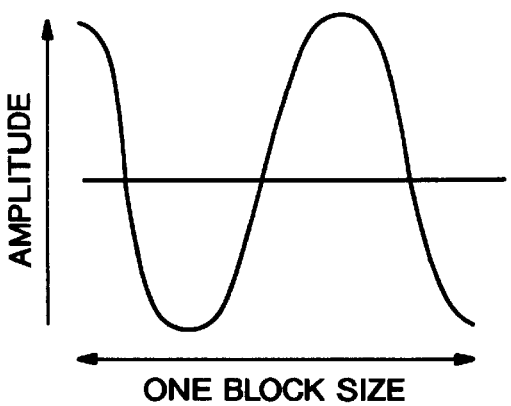
FIGS. 13B and 13C are diagrams illustrating examples of odd functions obtained by means of the quantization result of the DCT coefficient used in FIG. 13A.
Figure 13C:
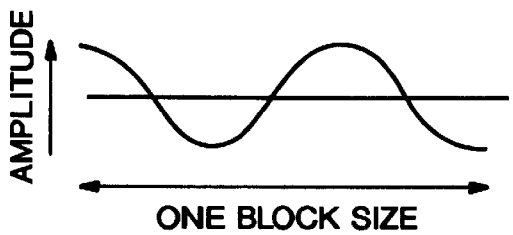

FIGS. 13A, 13B and 13C are diagrams showing basic images corresponding to transformation coefficients in the main scanning direction of address 6 according to the first embodiment. In this case also, when the higher representative value is selected, the amplitude of FIG. 13A, for example, varies in the manner shown in FIG. 13B. When the lower representative value is selected, the amplitude of FIG. 13A varies in the manner shown in FIG. 13C.

In a case where the higher representative value has been selected even at address 6 even though the higher representative value has been selected at address 1 and the state of Fig. 11C prevails, i.e., in the state of FIG. 13B, errors at the block boundaries are added and image deterioration becomes conspicuous. In other words, in a case where it is desired that a quantization error at a block boundary generated at address 1 be brought in a direction where it will be canceled by a quantization error at address 6, which is another odd function, i.e., in a case where the higher representative value is selected at address 1, a lower representative value is selected at address 6. This is the role of the adder 105 shown in FIG. 10. More specifically, if the output of the subtractor 106 at the time of address 1 is positive, a negative value corresponding to the inputted value is outputted by the LUT of the addition-value creating unit 107. After a delay of several addresses applied by the delay circuit 108, the adder 105 adds the negative value to the DCT coefficient at address 6 to make the lower representative value easier to select. The error at the block boundary is canceled out by both quantization errors. Similarly, if the subtractor 106 outputs a negative value, the corresponding positive value is outputted by the addition-value creating unit 107 and this is added on, thereby making the higher representative value easier to select.

FIGS. 14A is an example of an actual image, and FIG. 14B is a diagram for describing DCT. FIGS. 14C and 14D are diagrams for describing quantization and IDCT according to the prior art. Further, FIGS. 15A, 15B are diagrams for describing quantization and IDCT according to the first embodiment. FIG. 14A illustrates an example of information of an actual image in block form, FIG. 14B shows transformation coefficients that have undergone DTC, FIG. 14C shows information after quantization (quantization coefficient×quantization step) in a conventional method by a certain Q table, and FIG. 14D illustrates information after decompression. In these examples, higher representative values are selected for both address 1 and address 6 in Fig. 11A. Consequently, the quantization errors at the block boundaries are added together and a tone jump at a nearby block may be predicted. Accordingly, in FIG. 15A, the fact that a higher representative value has been selected for address 1 is sensed, i.e., the subtractor 106 in FIG. 10 calculates a quantization error of "+8" and inputs this to the addition-value creating unit 107, whereby the lower representative value is selected at address 6. FIG. 15B illustrates information obtained by decompressing FIG. 15A. Here cancellation of quantization errors at the block boundaries is carried out. Thus, since DCT coefficients are added and subtracted, quantization error of the same or greater magnitude is obtained and the tendency is toward a worsening S/N ratio. However, since distortion is brought to the center of the block, block distortion is reduced.

In the first embodiment, control of address 6 by the quantization error of address 1 in Fig. 11A is described. However, operation is similar for other odd functions, such as control of address 9 by the quantization error of address 2.

Further, the hardware configuration of FIG. 10 is one example for practicing the invention, and it goes without saying that other hardware arrangements may be employed.

In the first embodiment, even if the value of Q/2 for adding or subtracting DCT coefficients of address 6 is changed, the quantization threshold voltage is altered and equivalence is obtained.

In addition, even if quantization is performed by raster scanning without using zigzag scanning, there is regularity in the generation of odd functions and quantization can be realized more easily.

<Second Embodiment>

FIGS. 16A, 16B, 16C, 16D, 16E, 16F, 16G and 16H are diagrams for describing a method of canceling quantization error according to a second embodiment.

In this embodiment, the content of processing is more restricted than in the first embodiment shown in FIG. 10. The solid lines in FIGS. 16A, 16B, 16C and 16D indicate basic images in a component of address i. The DCT coefficient of address i of an odd function is quantized and the AC power changes. As a result, it is assumed that the amplitude varies in the manner of the dashed lines. In this case, in the first embodiment, errors at block boundaries are canceled by quantization errors of other odd-function components. According to this embodiment, however, processing of address j, which is another odd function, is performed solely in a direction in which amplitude decreases. Accordingly, a description will be given for a case where i=1, j=6 at the zigzag scanning addresses shown in FIG. 11A.

Figure 16A:
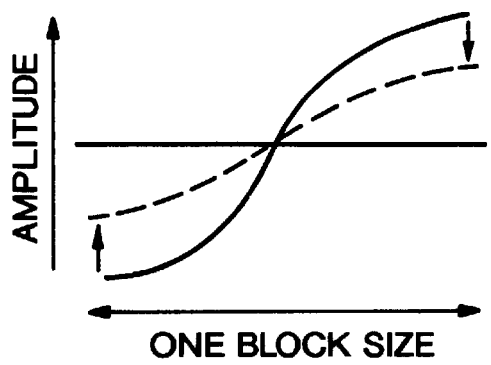
Figure 16B:
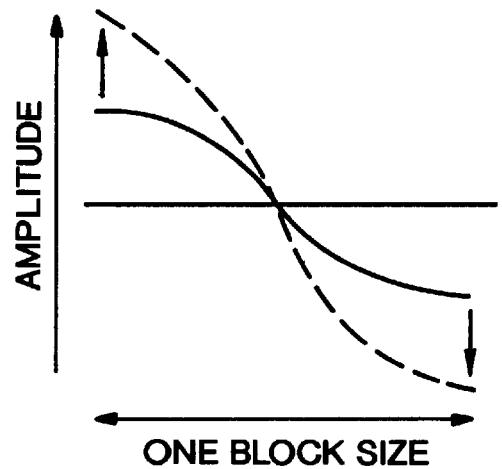
Figure 16C:
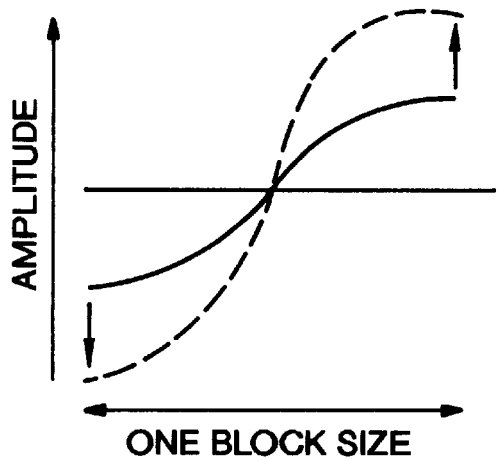
Figure 16D:
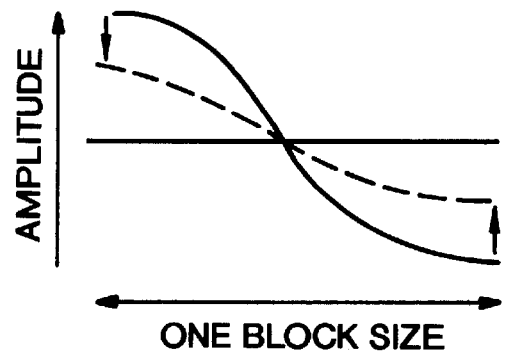

The occurrence of quantization error at address 1 takes on any one of the patterns of FIGS. 16A, 16B, 16C and 16D. In the case of FIGS. 16A and 16B, the difference in the DCT transformation coefficient F(1) is positive from the product of quantization step Q(1) and quantization coefficient C(1) at address 1. In other words, the quantization error is positive. The cancellation of quantization error at the block boundary at address 6 can be achieved by the processing of FIGS. 16E and 16H. However, the quantization error is such that the more the amplitude is increased, the more contrast increases and the more the image deteriorates. Conversely, the more amplitude decreases, the more MTF becomes a flat image. However, there are instances in which the degree of image deterioration is less than in the former case. That is, even if the S/N ratio is the same, picture quality changes depending upon how the quantization error is taken.

Accordingly, in the case of FIGS. 16A and 16B, it is so arranged that the processing of FIG. 16F is executed. That is, the subtraction of F(6) is performed only in a case where the polarity of F(6) is F(6)>0. If F(6)<0 holds, the signal passes through the quantizing circuit as is. Similarly, in a case where the quantization error of FIGS. 16C and 16D occurs for address 1, at address 6 the processing of FIG. 16G for reducing contrast is executed.

In this embodiment, even if the quantization error of other odd functions increases, processing is executed in a direction in which amplitude decreases. Consequently, not only is error canceled out at block boundaries but deterioration in picture quality within a block becomes less conspicuous as well. In addition, since the direction is such that the absolute value of quantization coefficients is decreased, this embodiment is useful in reducing the amount of code in a case where a method of compressing variable-length codes is adopted, as in the JPEG method.

<Third Embodiment>

Figure 17:
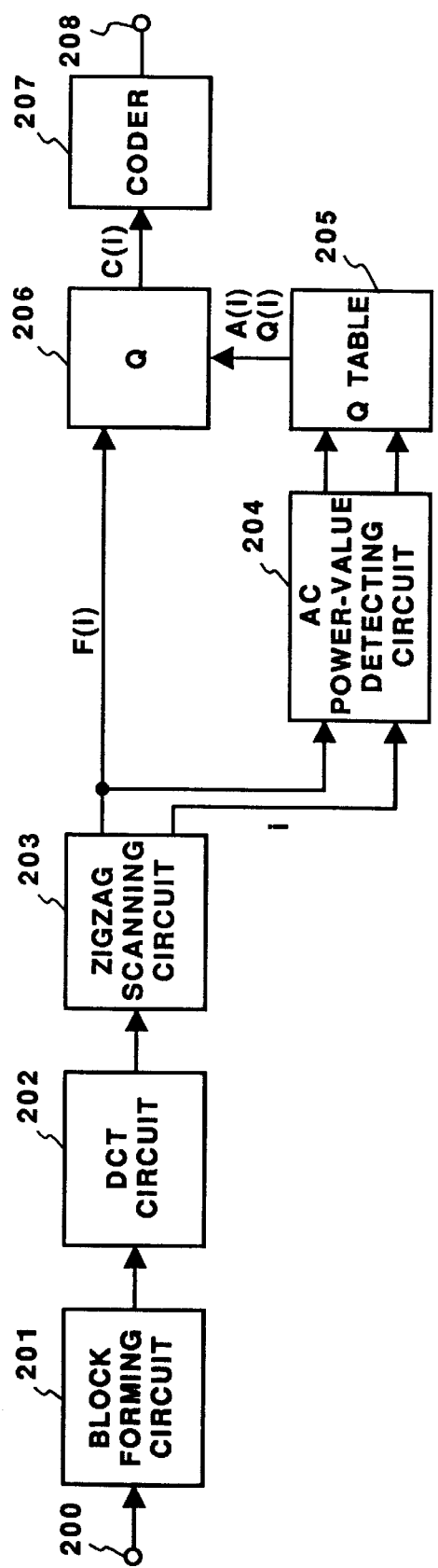
FIG. 17 is a block diagram showing an example of the construction of a third embodiment according to the present invention.

FIG. 17 is a block diagram showing an example of the construction of a third embodiment.

In the third embodiment, noise generated when quantizing orthogonal transformation coefficients is visually reduced. The method of orthogonal transformation and the method of quantization are the same as those in the first embodiment. Accordingly, in FIG. 17, the details of the arrangement necessary for quantization are illustrated but the details of the arrangement necessary for coding are omitted.

In FIG. 17, numeral 200 denotes an input terminal, 201 a block forming circuit, 202 a DCT circuit, 203 a zigzag scanning circuit, 204 an AC power-value detecting circuit, 205 a Q table, 206 a quantizer, 207 a coder, and 208 an output terminal.

The operation of FIG. 17 will be described first.

Full-color image data inputted from the input terminal 200 is cut into pixel blocks of 8—8 pixels in the block forming circuit 201, the output of the circuit 201 is subjected to an orthogonal transformation in the DCT circuit 202, and the transformation coefficients are supplied to the zigzag scanning circuit 203.

Figure 1:
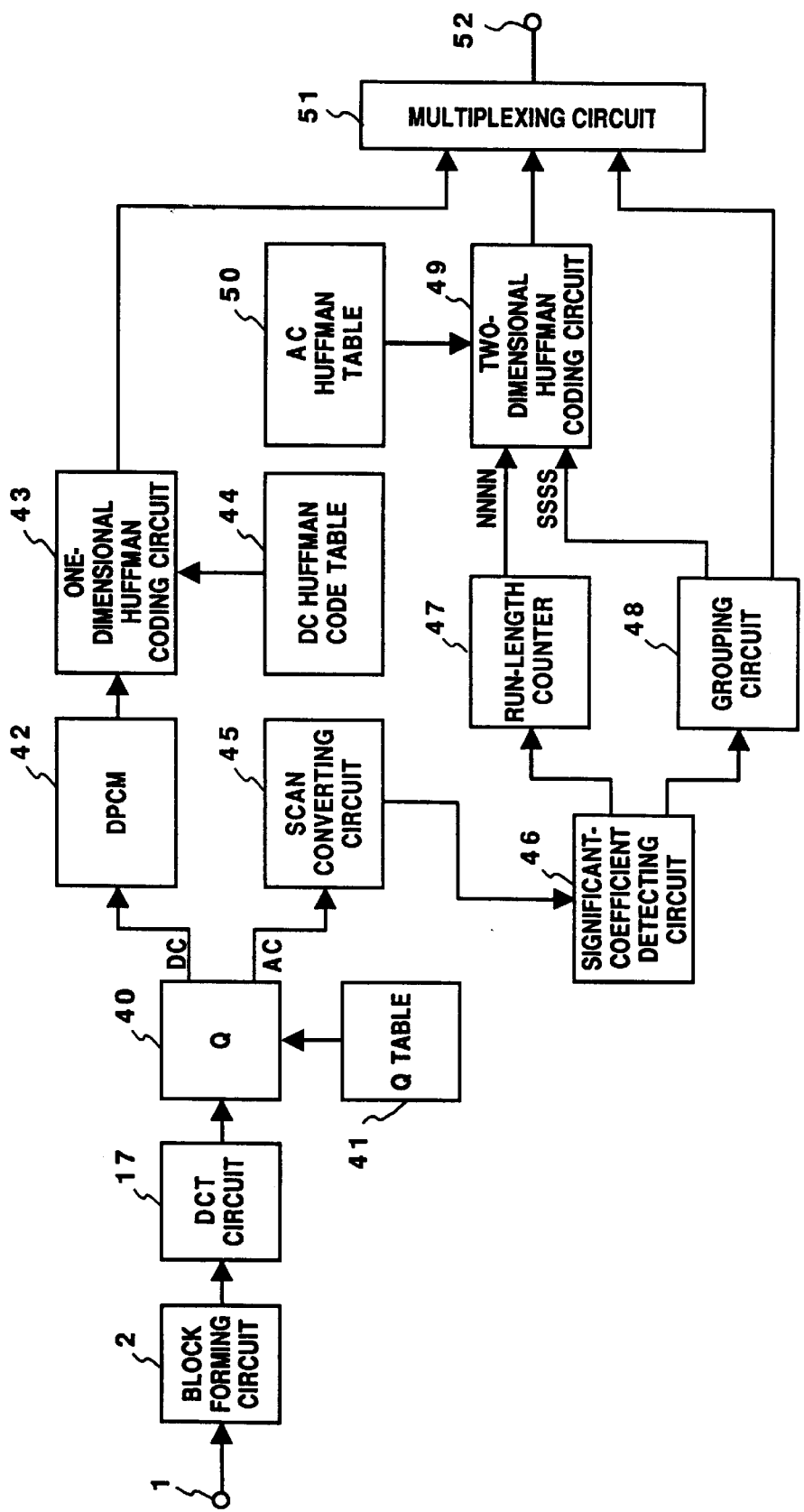
FIG. 1 is a block diagram showing the construction of an image compressing apparatus according to the prior art.
Figure 2:
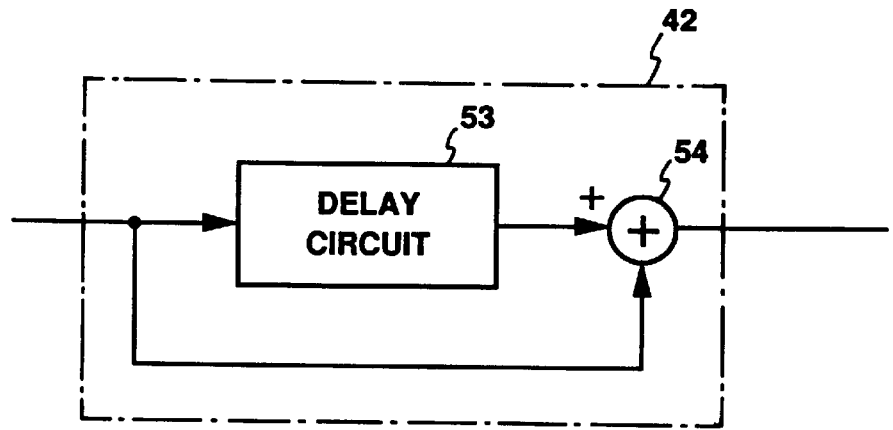
FIG. 2 is a block diagram showing the construction of a DPCM in FIG. 1.
Figure 3:
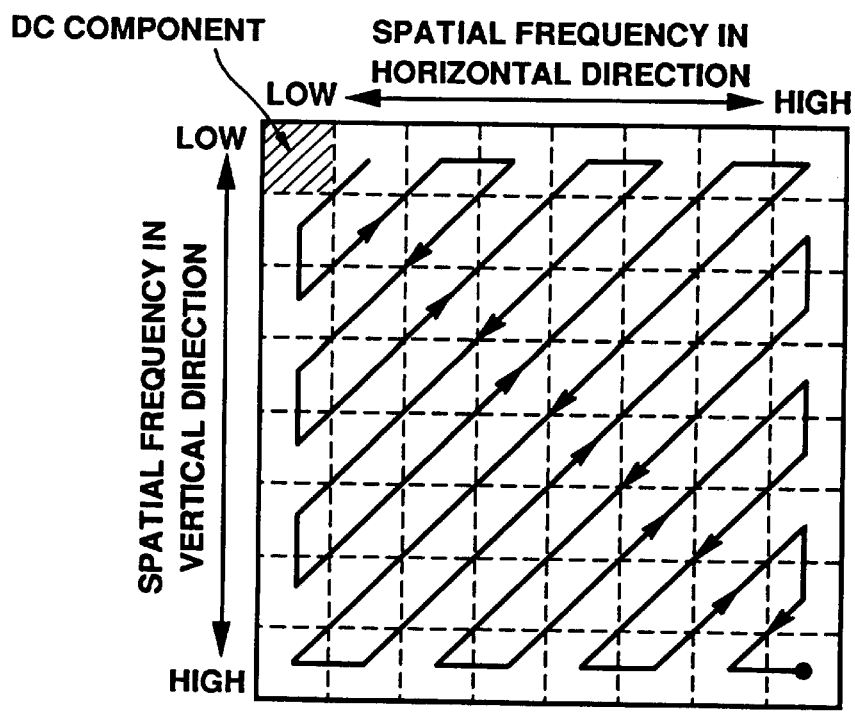
FIG. 3 is a diagram for describing the scanning sequence of DCT coefficients according to the prior art.
Figure 4:
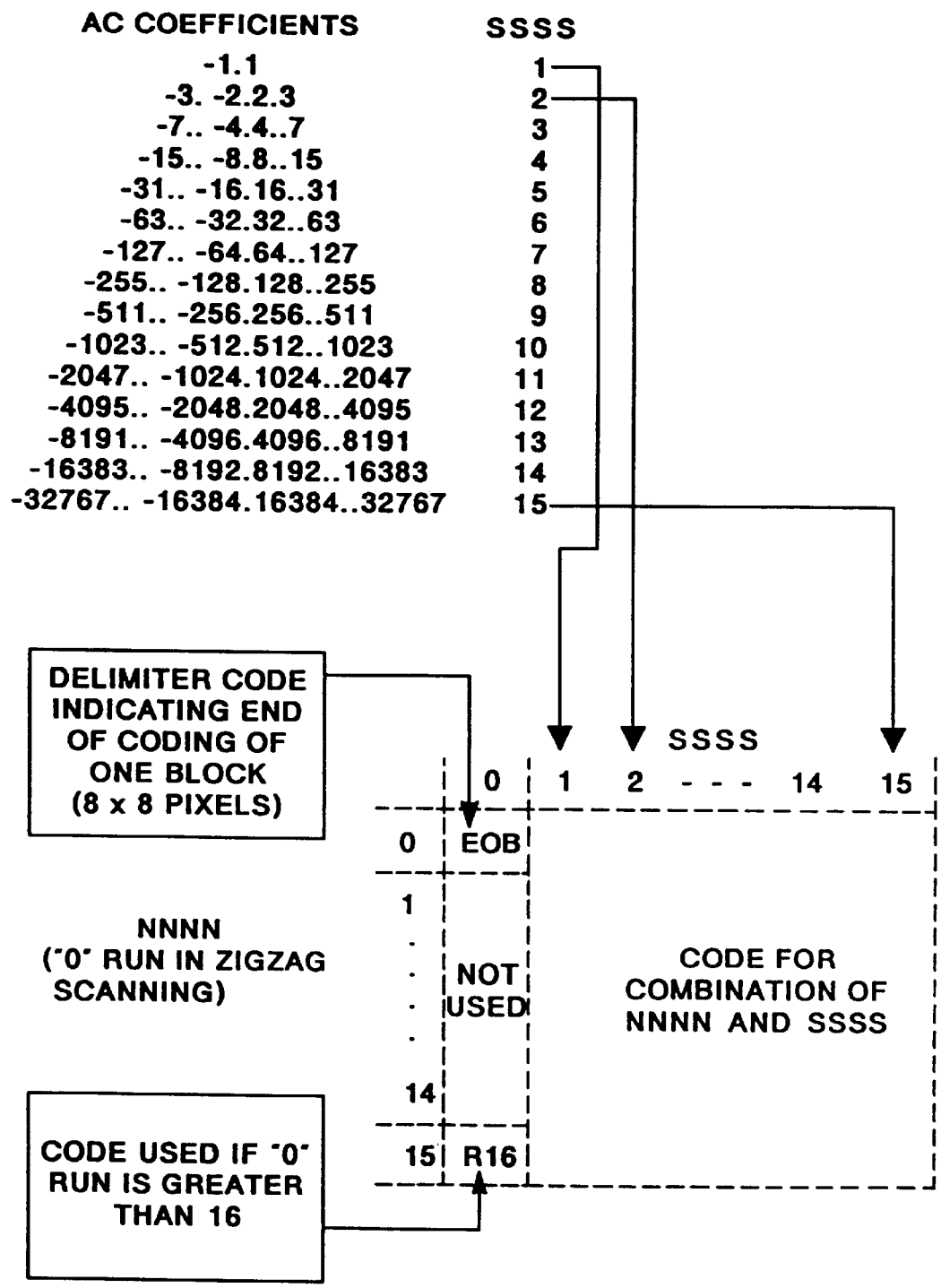
FIG. 4 is a diagram for describing the relationship between AC coefficients and a group number SSSS according to the prior art.

As in FIG. 3, the zigzag scanning circuit 203 zigzag scans orthogonal transformation coefficients from the low frequency region to the high frequency region and outputs an orthogonal transformation coefficient F(i) and an address i representing the position of the orthogonal transformation coefficient F(i) within the block. The orthogonal transformation coefficient F(i) is supplied to the AC power-value detecting circuit 204 and the Q 206, and the address i is supplied to the AC power-value detecting circuit 204.

The AC power-value detecting circuit 204 compares the output value of the orthogonal transformation coefficient F(i) (which may simply be an absolute value) and a predetermined threshold value. However, the AC power-value detecting circuit 204 determines whether the inputted orthogonal transformation coefficient F(i) is a low frequency-region component or a high frequency-region component based upon the inputted address i. When the address i is less than a predetermined value (the low frequency region side), the circuit 204 outputs a result to the effect that the power value of the orthogonal transformation coefficient F(i) is smaller than the threshold value irrespective of the power value of the orthogonal transformation coefficient. The result of the comparison performed by the AC power-value detecting circuit 204 and the address i are supplied to the Q table 205.

The Q table 205 is constituted by an LUT or the like. An addition value A(i) and a quantization step Q(i) corresponding to the inputted address i and the results of comparison performed by the AC power-value detecting circuit 204 are sent to the quantizer 206.

The quantizer 206 also is constituted by an LUT or the like and outputs a quantization coefficient C(i) based upon the calculations shown below, in which i represents the address, F(i) the orthogonal transformation coefficient, Q(i) the quantization step and A(i) the addition value.

$$C(i)=[F(i)+A(i)]/Q(i) \qquad [F(i) \geq 0]$$

$$C(i)=[F(i)-A(i)]/Q(i) \qquad [F(i)<0]$$

The quantization coefficient C(i) outputted by the quantizer 206 is coded by the coder 207, and compressed image data is outputted from the output terminal 208.

A method of realizing quantization with low visual noise will be described next.

FIGS. 18A through 18C illustrate basic images corresponding to an orthogonal transformation coefficient F(i) in the high frequency region. In FIGS. 18A through 18C, the description will be given with regard to a one-dimensional direction for the sake of simplicity. When a quantization error is applied by quantization to the basic image shown in FIG. 18A, the result is an image of increased amplitude indicated by the dashed line in FIG. 18B or an image of decreased amplitude indicated by the dashed line in FIG. 18C. When amplitude is increased or decreased depends upon whether a "higher representative value" or a "lower representative value" is outputted as the quantization coefficient C(i). In other words, the "higher representative value" is decided upon in a case where the absolute value of the orthogonal transformation coefficient F(i) is greater than the set quantization threshold value, and the "lower representative value" is decided upon in a case where the above-mentioned threshold value is greater.

When the "higher representative value" is selected at quantization of the high-region orthogonal transformation coefficient F(i), the amplitude of the image component relating to this orthogonal transformation coefficient F(i) becomes larger (the contrast of the image is intensified) and a deterioration in picture quality referred to as mosquito noise develops, in which a collection of white and black dots begins to appear near the edge of the image.

Conversely, when the "lower representative value" is selected, the amplitude of the image component diminishes and the contrast of the image weakens.

However, mosquito noise is not produced, and in general, the resulting image does not undergo conspicuous deterioration in quality, and the image does not appear unpleasant.

Accordingly, in this embodiment, quantization having low visual noise is realized by quantizing the high-region components in DCT space in such a manner that they become "lower representative values". More specifically, by varying the addition value A(i), which is outputted by the Q table 205, in dependence upon the power value of the high-region orthogonal transformation coefficient F(i), i.e., in dependence upon the size of the predicted error, the orthogonal transformation coefficient F(i) is quantized so as to become the "lower representative value".

The specifics for setting the addition value A(i) will now be described.

For example, let the addition value A(i) be ½ of the quantization step Q(1) [A(i)=Q(i)/2]. In such case, the quantization threshold value becomes a point intermediate the representative values, and an arithmetic operation equivalent to rounding to the nearest whole number is applied to the orthogonal transformation coefficient F(i). The result of this operation is outputted as the quantization coefficient C(i). Further, when A(i)=0 holds, for example, an arithmetic operation equivalent to omission is applied to the orthogonal transformation coefficient F(i). The result of this operation is outputted as the quantization coefficient C(i). In other words, by varying the addition value A(i) from 0 to Q(i)/2, the quantized representative value becomes the "lower representative value". The ease with which this occurs can readily be changed.

FIG. 19 illustrates an example of linear quantization used in the JPEG method, for example, according to the prior art. FIG. 20 illustrates an example of non-linear quantization according to this embodiment. In both FIGS. 19 and 20, the quantization coefficients C(i) outputted by the quantizer 206 are plotted along the vertical axis, the orthogonal transformation coefficients F(i) inputted to the quantizer 206 are plotted along the horizontal axis, and the scale along the horizontal axis represents the quantization step Q.

FIG. 19 is a graph obtained when quantization equivalent to rounding off to the nearest whole number is carried out with addition value A(i)=Q(i)/2 holding and with the quantization threshold value being a point intermediate the representative values.

FIG. 20 illustrates an example of quantization with regard to high-region components in DCT space. When the absolute value of orthogonal transformation coefficient F(i) is less than a certain fixed value, i.e., when |F(i)|<2Q holds, we have addition value A(i)=Q(i)/2 and quantization equivalent to rounding off to the nearest whole number is carried out. When the absolute value of orthogonal transformation coefficient F(i) is greater than a certain fixed value, i.e., when |F(i)|>2Q holds, we have addition value A(i)=0 and quantization equivalent to omission is carried out.

More specifically, in an image recording apparatus such as a printer, a fixed error is applied in advance and a boundary value of the orthogonal transformation coefficient F(i) at which mosquito noise due to quantization becomes conspicuous is obtained experimentally. The boundary value obtained and orthogonal transformation coefficient F(i) are compared by the AC power-value detecting circuit 204. When the orthogonal transformation coefficient F(i) is found to be less than the boundary value by this comparison, the Q table 205 supplies the quantizer 206 with the quantization step Q(i) and addition value A(i) in such a manner that quantization equivalent to rounding off to the nearest whole number is performed. The quantizer 206 performs quantization which minimizes the quantization error. On the other hand, when the orthogonal transformation coefficient F(i) is found to exceed the boundary value by the comparison, the Q table 205 supplies the quantizer 206 with the quantization step Q(i) and addition value A(i) in such a manner that quantization equivalent to omission is performed. The quantizer 206 performs quantization in which mosquito noise is suppressed. However, when the orthogonal transformation coefficient F(i) is a low-region component, the AC power-value detecting circuit 204 outputs a result to the effect that the orthogonal transformation coefficient F(i) is smaller than the boundary value irrespective of the orthogonal transformation coefficient F(i). As a consequence, the quantizer 206 performs quantization in which quantization error is minimized.

In FIG. 20, an example is illustrated in which the addition value A(i)=Q(i)/2 holds when |F(i)|<2Q and the addition value A(i)=0 holds when |F(i)|>2Q. However, the embodiment is not limited to this example and it goes without saying that any addition value A(i) which satisfies 0≦A(i) ≦Q(i)/2 can be set.

In FIG. 17, an arrangement in which the AC power-value detecting circuit 204 is made a ROM in operative association with the Q table 205 or quantizer 206 also is considered to be an application of this embodiment.

According to the description of this embodiment and FIG. 17, an orthogonal transformation based upon DCT of 8×8 pixels is used to render the description. However, this embodiment is not limited to this arrangement, and it goes without saying that the embodiment can be worked by an orthogonal transformation using any block size and any method.

In accordance with this embodiment, as described above, there can be provided an image processing apparatus in which ringing referred to as mosquito noise does not occur near the edges of a decompressed image even when coarse quantization is performed, thereby making it possible to suppress a deterioration in picture quality.

<Fourth Embodiment>

A fourth embodiment of the present invention will now be described.

In the fourth embodiment, components similar to those in the third embodiment are designated by like reference characters and need not be described again.

According to the third embodiment, the addition value A(i) supplied to the quantizer 206 is adjusted to an appropriate value based upon the AC power values of the individual transformation coefficients F(i). In accordance with the fourth embodiment, on the other hand, an appropriate Q table is selected from among a plurality of Q tables depending upon the orthogonal transformation coefficient of the high frequency region, and the quantization step Q(i) and addition value A(i) are supplied to the quantizer 206.

Figure 21:
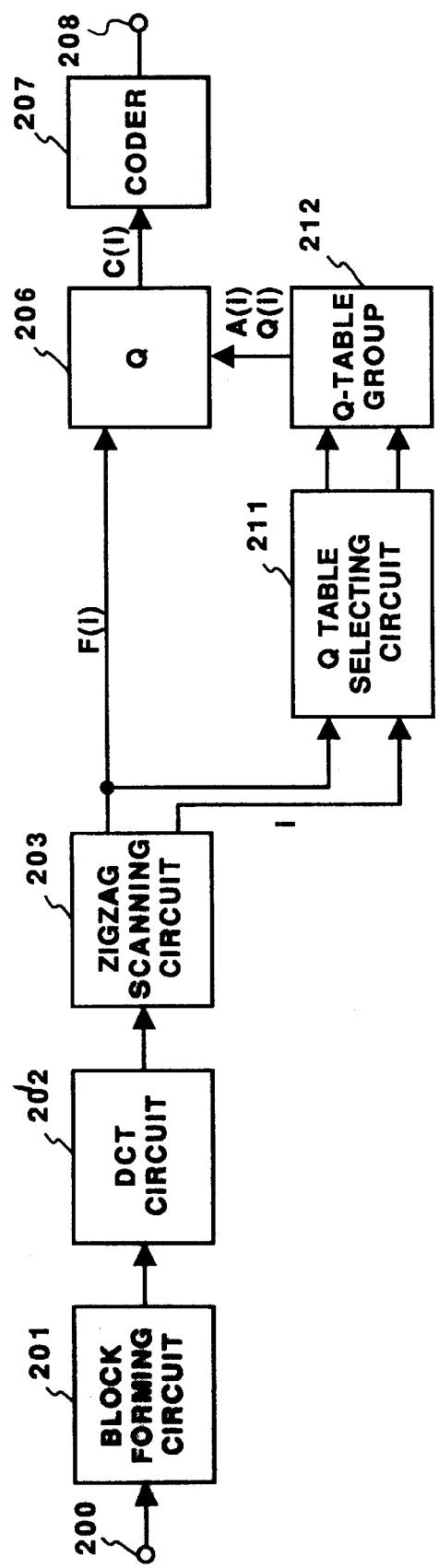
FIG. 21 is a block diagram showing an example of the construction of a fourth embodiment according to the present invention.

FIG. 21 is a block diagram showing an example of the construction of the fourth embodiment.

In FIG. 21, numeral 211 denotes a Q table selecting circuit and 212 a group of Q tables. Operation from the input terminal 200 to the zigzag scanning circuit 203 and from the quantizer 206 to the output terminal 208 is similar to that of the third embodiment and need not be described again here.

FIGS. 22 and 23 are diagrams illustrating example of quantization tables.

FIG. 22 illustrates an example of a standard quantization table. Here quantization equivalent to rounding off to the nearest whole number described in the third embodiment is performed. FIG. 23 illustrates an example of a quantization table appropriate for quantizing high frequency-region components. Here quantization equivalent to omission described in the third embodiment is performed.

When there is no orthogonal transformation coefficient F(i) greater than a certain set threshold value in the high region of DCT space, the Q table selecting circuit 211 selects a quantization table of the kind shown in FIG. 22, for example, from the Q-table group 212, and the quantizer 206 performs quantization equivalent to rounding off to the nearest whole number over the entire region of DCT space.

On the other hand, when there is an orthogonal transformation coefficient F(i) greater than a certain set threshold value in the high region of DCT space, the Q table selecting circuit 211 selects a quantization table of the kind shown in FIG. 23, for example, from the Q-table group 212, and the quantizer 206 performs quantization equivalent to omission over the entire region of DCT space, thereby suppressing mosquito noise.

FIG. 24 is a diagram illustrating an example of quantization according to the fourth embodiment.

Generally, at the edge of an image or in the case of line drawings and characters, AC power becomes large not only in the high frequency region of DCT space but also in the low frequency region. Therefore, carrying out quantization equivalent to omission in the entire region of DCT space makes it possible to reduce the quantization coefficient. Furthermore, when quantization coefficients are subjected to entropy coding, this contributes to a reduction in the amount of information after coding.

In accordance with the present embodiment, as described above, mosquito noise imaging does not occur near the edges of a decompressed image even when coarse quantization is performed, thereby making it possible to suppress a deterioration in picture quality in the same manner as in the third embodiment. An additional effect is that the amount of information after coding of image edges, line drawings and characters is reduced.

Further, an arrangement in which the third and fourth embodiments are combined is conceivable. It is also permissible to supply the quantizer 206 with Q(i) and an experimentally obtained addition value A(i) [0 ≦A(i)≦Q(i) /2] in correspondence with the address i within the block, irrespective of the orthogonal transformation coefficient F(i).

It should be noted that the present invention may be applied to a system composed of a plurality of devices or to an apparatus comprising one device. It goes without saying that the present invention can be applied also to a case where the above-mentioned effects are attained by supplying a program to a system or apparatus.

In accordance with the present invention, as described above, block distortion and mosquito noise which give rise to a visually conspicuous decline in picture quality can be mitigated through a very simple arrangement. In addition, in a case where variable-length coding is applied, the amount of code can be reduced by performing quantization in a direction which reduces amplitude.

As many apparently widely different embodiments of the present invention can be made without departing from the spirit and scope thereof, it is to be understood that the invention is not limited to the specific embodiments thereof except as defined in the appended claims.

What is claimed is: :

1. An image encoding apparatus comprising:

transforming means for executing orthogonal-transformation on image data representing an image and generating orthogonal-transformation coefficients;

detecting means for detecting quantization error caused by quantizing a first orthogonal-transformation coefficient;

quantizing means for quantizing a second orthogonal-transformation coefficient; and controlling means for controlling a quantization condition of said quantizing means based on the quantization error of the first orthogonal-transformation coefficient without performing reverse orthogonal-transformation on the quantization error so as to reduce the quantization error of the first orthogonal-transformation coefficient.

2. The apparatus according to claim 1, wherein the first and second orthogonal-transformation coefficients are positioned at different positions from each other within a block which is a unit of the orthogonal-transformation.

3. The apparatus according to claim 1, wherein the quantization error of the first orthogonal-transformation coefficient is detected based on a difference between the first orthogonal-transformation coefficient and a quantized first orthogonal-transformation coefficient.

4. The apparatus according to claim 1, wherein said quantizing means performs quantization using a quantization table.

5. The apparatus according to claim 1, wherein the first orthogonal-coefficient represents a first spatial frequency component corresponding to a first odd function in a predetermined direction, and the second orthogonal-coefficient represents a second spatial frequency component corresponding to a second odd function in the predetermined direction.

6. The apparatus according to claim 5, wherein the first spatial frequency component has higher spatial frequency than the second spatial frequency component.

7. An image encoding method comprising:

a transforming step of executing orthogonal-transformation on image data representing an image and generating orthogonal-transformation coefficients;

a detecting step of detecting quantization error caused by quantizing a first orthogonal-transformation coefficient;

a quantizing step of quantizing a second orthogonal-transformation coefficient; and a controlling step of controlling a quantization condition for the second orthogonal-transformation coefficient based on the quantization error of the first orthogonal-transformation coefficient prior to execution of said quantizing step without performing reverse orthogonal-transformation on the quantization error so as to reduce the quantization error of the first orthogonal-transformation coefficient.

8. The method according to claim 7, wherein the first and second orthogonal-transformation coefficients are positioned at different positions from each other within a block which is a unit of the orthogonal-transformation.

9. The method according to claim 7, wherein the quantization error of the first orthogonal-transformation coefficient is detected based on a difference between the first orthogonal-transformation coefficient and a quantized first orthogonal-transformation coefficient.

10. The method according to claim 7, wherein the quantization step performs quantization using a quantization table.

11. The method according to claim 7, wherein the first orthogonal-coefficient represents a first spatial frequency component corresponding to a first odd function in a predetermined direction, and the second orthogonal-coefficient represents a second spatial frequency component corresponding to a second odd function in the predetermined direction.

12. The method according to claim 11, wherein the first spatial frequency component has higher spatial frequency than the second spatial frequency component.

* * * * *

UNITED STATES PATENT AND TRADEMARK OFFICE
CERTIFICATE OF CORRECTION

PATENT NO. : 5,822,462
DATED : October 13, 1998
INVENTOR(S)): NOBUTAKA MIYAKE

Page 1 of 3

It is certified that error appears in the above-identified patent and that said Letters Patent is hereby corrected as shown below:

ON THE COVER PAGE AT [56] REFERENCES CITED, U.S. PATENT DOCUMENTS

"Daly et a." should read --Daly et al.--.

COLUMN 1

Line 21, "Vol. b 18," should read --Vol. 18,--;
Line 63, "zigzag scanned" should read --zigzag-scanned--.

COLUMN 3

Line 3, "low" should read --low frequency--;
Line 5, "high" should read --high frequency--;
Line 9, "high" should read --high frequency--;
Line 11, "low" should read --low frequency--;
Line 16, "to" should read --to sometimes--; and "so-called" should be deleted;
Line 52, "provided" should be deleted.

COLUMN 4

Line 44, "Fig." should read --FIG.--;
Line 46, "Fig." should read --FIG.--;
Line 47, "1." should read --1;--;
Line 48, "Figs." should read --FIGS.--;
Line 50, "11B." should read --11B;--;
Line 54, "6." should read --6;--;
Line 57, "13A." should read --13A;--.

UNITED STATES PATENT AND TRADEMARK OFFICE
CERTIFICATE OF CORRECTION

PATENT NO. : 5,822,462

DATED : October 13, 1998

INVENTOR(S)): NOBUTAKA MIYAKE

It is certified that error appears in the above-identified patent and that said Letters Patent is hereby corrected as shown below:

COLUMN 5

Line 4, "is a" should be deleted,

COLUMN 6

Line 26, "Fig." should read --FIG.--;
Line 37, "Fig." should read --FIG.--;
Line 38, "Fig." (both occurrences) should read --FIG.--;
Line 43, "a component of" and "either" should be deleted--;
Line 44, "th" should read --the--; and "direction" should read --direction,--;
Line 45, "among the 23" should read --in the 63--.

COLUMN 7

Line 28, "FIGS." should read --FIG.--;
Line 40, "Fig." should read --FIG.--;
Line 57, "Fig." should read --FIG.--.

COLUMN 8

Line 43, "F(6)>0." should read --F(6)$\geq$0.--

COLUMN 9

Line 28, "frequency-region" (both occurrences) should read --frequency region--.

UNITED STATES PATENT AND TRADEMARK OFFICE
CERTIFICATE OF CORRECTION

PATENT NO. : 5,822,462

DATED : October 13, 1998

INVENTOR(S)): NOBUTAKA MIYAKE

It is certified that error appears in the above-identified patent and that said Letters Patent is hereby corrected as shown below:

COLUMN 11

Line 35, "$|F(i)|< 2Q$" should read --$|F(i)|\leq 2Q$--;
Line 37, "example" should read --example,--.

COLUMN 12

Line 12, "example" should read --examples--;
Line 18, "frequency-region" should read --frequency region--.

Signed and Sealed this

Seventh Day of December, 1999

*Attest:*

Q. TODD DICKINSON

*Attesting Officer*   *Acting Commissioner of Patents and Trademarks*